US012646517B2

(12) United States Patent
Smith et al.

(10) Patent No.:  US 12,646,517 B2
(45) Date of Patent:       Jun. 2, 2026

(54) VIRTUAL REALITY HEADSET AND ARTIFICIAL INTELLIGENCE VIRTUAL ASSISTANT INTEGRATION FOR ADDRESSING A LANGUAGE BARRIER WITH A CUSTOMER

(71) Applicant: Bank of America Corporation, Charlotte, NC (US)

(72) Inventors: Brian Smith, Jacksonville, FL (US); Jonathan Coffey, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 208 days.

(21) Appl. No.: 18/659,097

(22) Filed: May 9, 2024

(65) Prior Publication Data

US 2025/0349293 A1      Nov. 13, 2025

(51) Int. Cl.
| | |
|---|---|
| *G10L 15/22* | (2006.01) |
| *G06F 9/451* | (2018.01) |
| *G06F 40/58* | (2020.01) |
| *G06Q 40/02* | (2023.01) |
| *G10L 13/02* | (2013.01) |
| *H04L 65/1083* | (2022.01) |

(52) U.S. Cl.
CPC ............. *G10L 15/22* (2013.01); *G06F 9/453* (2018.02); *G06F 40/58* (2020.01); *G06Q 40/02* (2013.01); *G10L 13/02* (2013.01); *H04L 65/1083* (2013.01)

(58) Field of Classification Search
CPC ......... G10L 15/22; G10L 13/02; G06F 9/453; G06F 40/58; G06Q 40/02; H04L 65/1083
See application file for complete search history.

(56) References Cited

U.S. PATENT DOCUMENTS

| | | | | |
|---|---|---|---|---|
| 10,614,828 B1* | 4/2020 | Cowburn | ................ | G06F 40/58 |
| 12,374,330 B1* | 7/2025 | Surkov | .................. | G06F 40/35 |
| 2003/0174178 A1* | 9/2003 | Hodges | .................. | G06Q 30/02 |
| | | | | 715/848 |
| 2014/0270109 A1* | 9/2014 | Riahi | ..................... | G06N 20/00 |
| | | | | 379/88.01 |

(Continued)

FOREIGN PATENT DOCUMENTS

| | | | | | |
|---|---|---|---|---|---|
| BR | 102021019976 A2 | * | 4/2023 | | |
| JP | 6980150 B1 | * | 12/2021 | ............... | H04N 7/15 |
| WO | WO-2024107297 A1 | * | 5/2024 | ............. | G06F 3/167 |

*Primary Examiner* — Brian L Albertalli

(74) *Attorney, Agent, or Firm* — Weiss & Arons LLP

(57) ABSTRACT

A method for improving service to a user encountering a language barrier. The user may encounter a language barrier when speaking to an agent or using a computer application of an organization. The user may use a VR headset to translate its request for assistance into a language used at the organization and transmit the translated request to an AI virtual assistant. The AI virtual assistant may confirm its understanding of the user's request, determine an agent in a team in the organization that can assist the user, and transfer the user to that agent. The user and the agent may each speak in a language in which they are proficient, even though the other is not proficient in that language, to resolve the user's request. An API may integrate the AI virtual assistant with the VR headset to facilitate real-time communication between the user and the agent.

20 Claims, 4 Drawing Sheets

(56)         References Cited

U.S. PATENT DOCUMENTS

| | | | | |
|---|---|---|---|---|
| 2016/0269508 | A1* | 9/2016 | Sharma | H04L 63/0884 |
| 2018/0095624 | A1* | 4/2018 | Osman | G06F 3/167 |
| 2018/0129276 | A1* | 5/2018 | Nguyen | G06F 3/0304 |
| 2021/0158621 | A1* | 5/2021 | Shatkina | G06F 3/011 |
| 2024/0330606 | A1* | 10/2024 | Wang | G06T 13/80 |
| 2024/0403596 | A1* | 12/2024 | Brannan | G06F 40/35 |
| 2025/0232543 | A1* | 7/2025 | Vivek | G06Q 40/08 |

\* cited by examiner

VIRTUAL REALITY HEADSET AND ARTIFICIAL INTELLIGENCE VIRTUAL ASSISTANT INTEGRATION FOR ADDRESSING A LANGUAGE BARRIER WITH A CUSTOMER

FIELD OF TECHNOLOGY

Aspects of the disclosure relate to servicing a user who is having trouble communicating due to a language barrier.

BACKGROUND OF THE DISCLOSURE

Out of an estimated population of 336 million people in the United States, about 29.6 million people may have limited English proficiency ("LEP") based on data released by the US Census in October 2023. An individual in the LEP category may include individuals who do not speak English as their primary language and who have a limited ability to read, speak, write, or understand English.

Members of the LEP population may need to engage in commerce and communicate with organizations where only English is spoken resulting in a communication gap. There may be a need to bridge this communication gap to enable members of the LEP population to fully engage in commerce and communicate or otherwise interact with organizations. Communication and other interaction may include speaking to an agent of the organization and utilizing a computer application of the organization. Organizations may include governmental organizations.

When a foreign language speaking user who does not have proficiency in speaking a local language enters a commercial brick-and-mortar location of an organization such as a financial center of a bank, the user may find limited resources for obtaining service and answering questions. The location may staff someone who knows the user's language or may staff someone remotely.

If the location does not have a foreign language speaking interpreter on-staff who is present when the user is being served, or does not staff one remotely, the user may be at a loss when seeking to communicate with the staff in the organization. Even if the location has a staff member who speaks the user's language, the staff member may be out of the office when the user comes to the location.

These situations may leave a user dissatisfied because the user's concerns were not fully and effectively addressed. The user may leave the location frustrated and disappointed.

There is a need to bridge a language barrier a user may encounter when the user lacks proficiency in a language spoken at a brick-and-mortar location of an organization or used by a computer application of the organization.

SUMMARY OF THE DISCLOSURE

There may be a need to bridge a language barrier between an organization and a user who is not proficient in the language used at the user's point of contact with the organization. Contact points for the user may include a brick-and-mortar location, a call center, a contact center, and a computer application of the organization. The user may reach out to the organization to address a request such as a request for goods, services, or information.

A virtual reality ("VR") headset integrated with an Artificial Intelligence ("AI") virtual assistant may be used to address the user's request. The VR headset may be integrated with the AI virtual assistant using an application programming interface ("API"). The API may facilitate transfer of data between the AI virtual assistant and the VR headset.

Data transferred by the API may include the user's request and the organization's subsequent response. The data transfer by the API may facilitate translation of the user's request by the VR headset and/or the AI virtual assistant. The translation may be between the language of the user and the language of the organization, and vice versa. The language of the organization may include the language of an agent or a computer application of the organization. The agent may be located at the brick-and-mortar location or may be located elsewhere such as at a call center or a contact center.

Overcoming the communication barrier between the user and an organization may result in the former having a positive experience with the organization. The experience may be like that of a person who does not have a communication barrier with the organization. The VR headset integrated with the AI virtual assistant using the API may assist the user. Such assistance may enable the organization to engage the user. This assistance may include translating the user's language and the organization's language such that the parties may understand each other.

The apparatus and method may contribute to accurate and efficient communication between the user and the organization. The apparatus and method may accurately address the concerns of the user in real-time.

In one exemplary use case, a user may approach an organization with a request to address a matter of importance. The user may make its request at a brick-and-mortar location of the organization. The user, while at the brick-and-mortar location, may be put in touch with an agent. The agent may be present at the brick-and-mortar location. The agent may be located at a site other than the brick-and-mortar location. The agent may be in a call center or a contact center of the organization.

The "user's language" may include a language in which the user is proficient. The "agent's language" may include a language in which the agent is proficient.

The user's language may be a language in which the agent is not proficient. The user's language may be a language in which the agent is proficient. The agent's language may be a language in which the user is not proficient. The agent's language may be a language in which the user is proficient.

The user's request may be made in the user's language at a brick-and-mortar location. The AI virtual assistant may direct the user's request to an agent in the organization. The user's language may be a language in which the agent is not proficient.

The user's request may be managed in real-time by the agent. The agent may be located at a location that is remote from the brick-and-mortar location where the user makes its request for assistance. The agent may be proficient in the language spoken by the user. The agent may not have proficiency in the language spoken by the user.

The method may include using a VR headset to translate a user's request for assistance from the user's language into text in the agent's language.

The user may be proficient in speaking the user's language. The user may have limited, elementary, or no practical proficiency in speaking the agent's language. The agent may have limited, elementary, or no practical proficiency in speaking the user's language.

The VR headset may identify the user's language. The user may convey a request for assistance to an organization using the user's language. The VR headset may translate the user's request for assistance from the user's language into text in the agent's language. The user may wear the VR headset at the brick-and-mortar location of an organization.

The method may include using the VR headset to transmit the text of the user's request to an artificial intelligence ("AI") virtual assistant. The API may integrate the AI virtual assistant with the VR headset. This integration may facilitate an exchange between the VR headset and the AI virtual assistant such as exchange of data.

The VR headset and AI virtual assistant API integration may be configured to facilitate addressing the request for assistance from the user. The user may speak a language other than the agent's language spoken at a brick-and-mortar location of the organization. The user may wear a VR headset. The VR headset may contain microphones that detect the language and words spoken by the user.

The user may make the request in the brick-and-mortar location of the organization. The organization may provide the VR headset to the user. The user may use its own VR headset at the brick-and-mortar location.

The method may include the user making the request for assistance at a location remote from the brick-and-mortar location of the organization. The user may use its own VR headset at a remote location. The user may use a VR headset supplied by the organization at a remote location.

The method may include the VR headset translating a user's request for assistance from the user's language into text in the agent's language. The VR headset may detect the user's communication with microphones present in the VR headset. The VR headset may contain trained artificial intelligence and/or machine learning algorithms to identify the specific language to translate the communication into text. The VR headset may store the text in a storage location on the VR headset. The VR headset may store the text in a remote storage location.

The agent may be present in the brick-and-mortar organization. The agent may be present in a call center and/or a contact center of the organization. The AI virtual assistant may direct the user's request to the agent.

The method may include the AI virtual assistant translating a user's request for assistance from the user's language into text in the agent's language. The AI virtual assistant may detect the user's communication with microphones present in the AI virtual assistant. The AI virtual assistant may contain trained artificial intelligence and/or machine learning algorithms to identify the specific language to translate the communication into text. The AI virtual assistant may store the text in a storage location on the AI virtual assistant. The AI virtual assistant may store the text in a remote storage location.

The API may transfer to the AI virtual assistant an electronic record of the communication from the user as detected by the VR headset. The API may transfer the electronic record of the communication in real-time. The API may transfer the electronic record in batches. The AI virtual assistant may store the text in a storage location on the VR headset. The AI virtual assistant may store the text in a remote storage location.

An API may be a standard of integration to provide one-way or two-way communication of data and information between the VR headset and AI virtual assistant.

The API used to integrate the VR headset and the AI virtual assistant may be Simple Object Access Protocol APIs ("SOAP APIs"), WebSocket APIs ("WebSocket APIs"), Remote Procedure Calls APIs ("RPC APIs"), or Representational State Transfer APIs (REST APIs ").

The selected API may be a private API. The selected API may be a public API.

The API may include endpoints. An API endpoint may be one end of a communication channel. An endpoint may be a touchpoint within the API that accepts requests from and sends back responses to another system. An API endpoint may be a way for the API to facilitate different systems and applications to communicate with each other. These different systems and applications may send and receive information and instructions via an API endpoint.

An endpoint may be a location from which APIs can access the resources they need to conduct their respective functions. An API endpoint may be associated with a Uniform Resource Locator (URL). An API server may host API endpoints such that the API server may accept, and process calls directed to the URLs of the endpoints.

The interface location between the API and the VR headset may be at an API endpoint. The API endpoint may accept a request from the VR headset. The API endpoint may send back a response to the VR headset.

The interface location between the API and the AI virtual assistant may be an API endpoint. The API endpoint may accept a request from the AI virtual assistant. The API endpoint may send back a response to the AI virtual assistant.

The endpoint in the API may accept a request from the VR headset and send back a response to the AI virtual assistant. The endpoint in the API may accept a request from the AI virtual assistant and send back a response to the VR headset. The endpoint of the API may be located within the VR headset. The endpoint of the API may be located remotely from the VR headset.

The API may be secured with authorization tokens. The API may be secured with API keys.

The method may include using the AI virtual assistant to confirm with the user that the AI virtual assistant correctly understands the request.

The method may include using the AI virtual assistant to determine a team in the organization that can assist the user. The team may be a team in a contact center. The team may be a team in a call center. The team may be a team in a department of the organization. The team may perform a designated function within the organization.

The team may include a user service team, a mortgage team, a credit card team, a debit card team, a cybersecurity team, an investment team, a banking account team, a fraud team, a refund team, an identify preservation team, a credit score team, and combinations of these teams.

The method may include using the AI virtual assistant to transfer the user to an agent in the team that was selected by the AI virtual assistant as being able to assist the user. The team may include two or more agents. The team may include one agent. The agent may be in a financial center. The agent may be in a store. The agent may be in a contact center. The agent may be in a call center.

The method may include using the AI virtual assistant integrated with the VR headset to conduct real-time communication between the agent and the user to resolve the user's request.

The brick and mortar location may be a financial center.

The AI virtual assistant may be a virtual financial assistant ("VFA").

The VR headset may utilize VR, augmented reality ("AR"), extended reality ("XR"), spatial computing, or combinations herein.

The VR headset may be provided to the user by the organization. The VR headset may be owned by a party other than the organization. The VR headset may be owned by the user.

The method may improve service for the user. The method of providing improved service to the user may lead to an improved level of user satisfaction.

The real-time communication between the agent and the user may include the VR headset worn by the user identifying and translating the spoken communication from of the user. The VR headset may identify the language of the user. The VR headset may translate the user's speech into text. The VR headset may be integrated with an API to send the AI virtual assistant the text. The VR headset may transmit the communication to the agent as text. The AI virtual assistant may transmit the communication to the agent as speech. The VR headset may transmit the communication to the agent as text. The VR headset may transmit the communication to the agent as speech.

The AI virtual assistant may transmit text typed by the agent to the VR headset worn by the user. The VR headset may present the communication to the user as text in the language the user made its request. The VR headset may present the communication as spoken words in the language the user made its request. The AI virtual assistant may be integrated into the VR headset to present the communication as spoken words in the language the user made its request.

The agent may type text that the AI virtual assistant transmits to the VR headset worn by the user. The VR headset may present the communication to the user as text. The VR headset may translate and present the text in the agent's language into the user's language.

The agent may use speech to reply to the user. The agent may wear a VR headset to translate the speech into text. The agent may speak to the AI virtual assistant, and the latter may translate the speech into text. The AI virtual assistant may transmit the text to the VR headset worn by the user. The VR headset may present the communication to the user as text. The VR headset may translate the communication and present it to the user in the language that the user made its request.

The agent's VR headset may translate a communication spoken by the agent in the agent's language. The agent's VR headset may translate the communication into text in the user's language. The AI virtual assistant may transmit the the text to the VR headset of the user in the user's language. The VR headset may present the communication to the user as text in the user's language or as speech in the user's language.

The agent may communicate in real-time with the user despite the agent not being proficient in the language spoken by the user.

The agent's language may be English. The user's language may be a language other than English.

Included may be a method for improving service to a user with whom there may be a language barrier when the agent uses a computer application of an organization.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
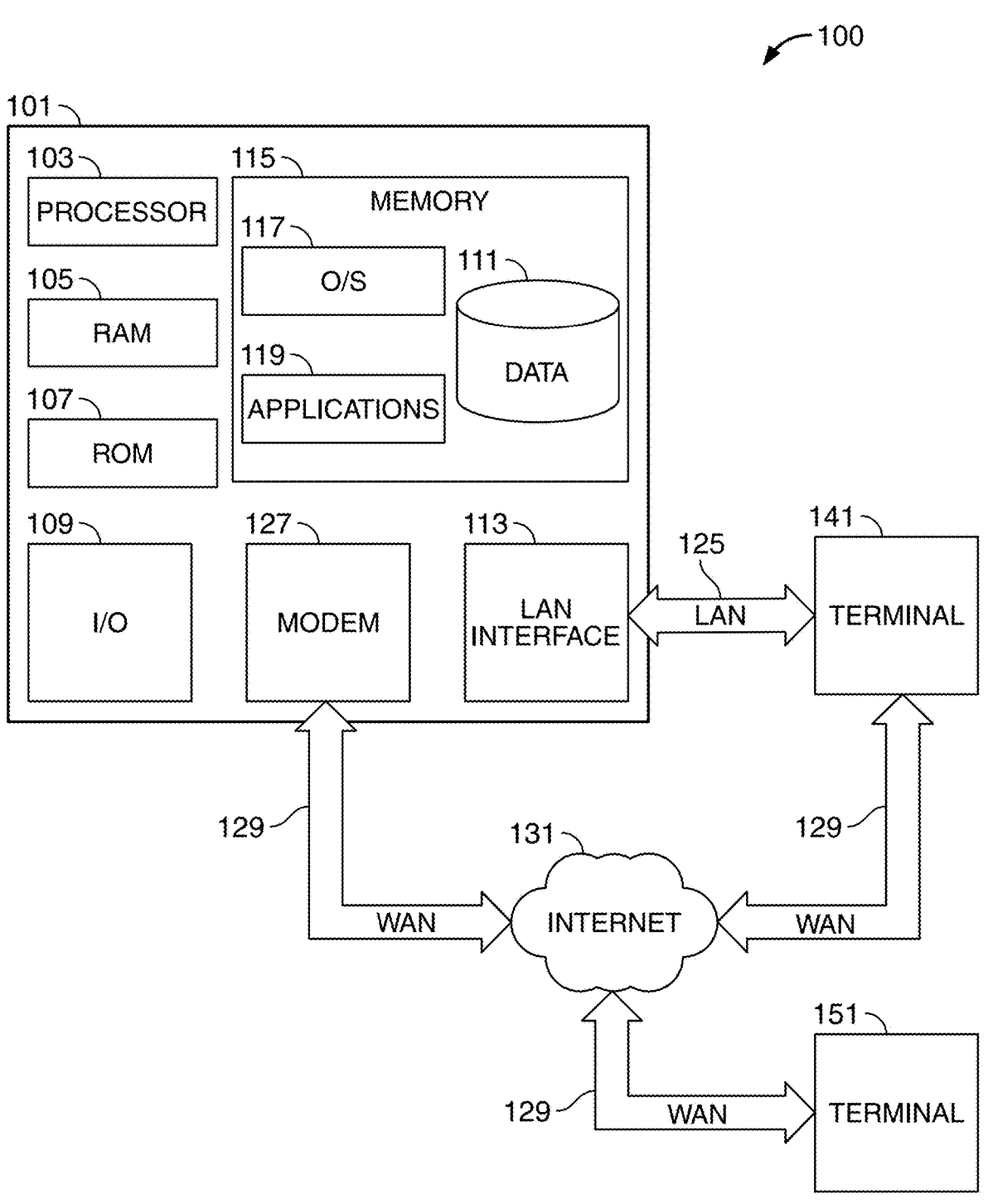
FIG. 1 shows an illustrative block diagram in accordance with principles of the disclosure.

Provided may be an apparatus and method for bridging a language barrier between an organization and a user who is not proficient in the language spoken at a brick-and-mortar location of the organization. The apparatus may implement the methods.

Bridging the language barrier may be addressed by the organization using a VR headset integrated with an AI virtual assistant to address a request of the user. The VR headset may be integrated with the AI virtual assistant using an API. The API may facilitate transfer of data between the AI virtual assistant and the VR headset.

The apparatus may include a system for improving service when there is a language barrier between the user and an organization such as an agent or a computer application of the organization. The agent may be located at a brick-and-mortar location, a call center, or a contact center of the organization. The user may not be proficient in the agent's language and/or the language of the computer application. The user may have a limited, elementary, or no practical proficiency in speaking the agent's language. The language barrier may be further exacerbated when the agent has a limited, elementary, or no practical proficiency in speaking the user's language.

The system may include using a VR headset. The VR headset may provide a virtual reality environment for the wearer. The VR headset may be a head-mounted device.

The system may include an AI virtual assistant. An API may integrate the AI virtual assistant with the VR headset. The API may facilitate transfer of data between the AI virtual assistant and the VR headset.

The API-integrated VR headset and AI virtual assistant may be configured to address a request for assistance from a user to the organization. The user may not be proficient in the agent's language. The user may wear a VR headset. The VR headset may contain a microphone that detects the speech of the user. The VR headset may recognize the language of the user's speech. The VR headset may translate speech in the user's language speech into text in the agent's language.

The user may make the request at the brick-and-mortar location. The organization may provide the VR headset to the user. The user may use their own VR headset at the brick-and-mortar location.

The VR headset may be configured to translate a user's request for assistance from the user's language into text in the agent's language. The VR headset may contain trained artificial intelligence and/or machine learning algorithms to identify the languages. The languages may include the user's language. The agent at the brick-and-mortar location may lack proficiency in the user's language. The VR headset may store the text in a storage location on the VR headset. The VR headset may store the text in a remote storage location.

The AI virtual assistant may be configured to translate a user's request for assistance from the user's language into text. The text may be in the agent's language.

The API may transfer a recording of speech detected by the VR headset. The API may transfer the electronic recording of speech in real-time. The API may transfer the electronic record in batches. The AI virtual assistant may contain trained artificial intelligence and/or machine learning algorithms to identify the language of the speech. The AI virtual assistant may translate the speech into text. The AI virtual assistant may store the text in a storage location on the VR headset. The AI virtual assistant may store the text in a remote storage location.

The API may integrate the AI virtual assistant with the VR headset. API may be a standard of integration to provide one-way or two-way communication of data and information between the VR headset and AI virtual assistant.

The API used may include one or more of the following types of APIs.

The API may use the Simple Object Access Protocol ("SOAP APIs"). SOAP APIs may be found commonly in previous generations of API usage. A party and the organization may exchange messages using XML.

The API may use the WebSocket ("WebSocket APIs"). WebSocket APIs may use JSON objects to pass data. Web-Socket APIs may facilitate two-way communication between a party and the organization. WebSocket APIs may provide callbacks that may allow for working with multiple threads. The callbacks that may facilitate working on something asynchronously. WebSocket APIs may be more efficient than other APIs in sending callback messages.

The API may use the Remote Procedure Calls ("RPC APIs"). RPC APIs may include obtaining input from a party. The input may be communicated electronically back to the organization.

The API may use Representational State Transfer (REST APIs "). REST APIs may be stateless. The REST APIs may include in each inquiry for output data from a server all the information necessary for processing the inquiry. REST APIs may obtain output data addressing the inquiry without requiring any data to be stored on the server.

The API used to integrate the VR headset and the AI virtual assistant may include a SOAP API, a WebSocket API, an RPC API, a REST API, and combinations herein.

The selected API may be a private API. The private API may be internal to the organization. The private API may connect an organization provided VR headset to the AI virtual assistant.

The selected API may be a public API. The public API may be open to the public. The public API may contain gating that only allows qualified parties to use the API. When a user uses a VR headset supplied to them by the organization, they may use the VR headset at a location that is remote from a brick-and-mortar location of the organization.

The VR headset may be integrated with the AI virtual assistant with a public API. The public API may be secured. Securing the public API may include limiting access, such as requiring a key or other cybersecurity measure. The public API may be secured to only allow access with a key or other cybersecurity measure.

The user may access the organization at the brick-and-mortar location of the organization. The user may access the organization remotely.

The user may use a VR headset owned by the organization. The user may use a VR headset they own. The VR headset may be integrated with the AI virtual assistant with a public API.

The API may include endpoints. An API endpoint may be one end of a communication channel. An endpoint may be a touchpoint within the API that accepts requests from and sends back responses to another system, server, or service. An API endpoint may be a way for the API to facilitate different systems and applications to communicate with each other. These different systems and applications may send and receive information and instructions via an API endpoint.

An endpoint may be a location from which APIs can access the resources they need to conduct their respective functions. An API endpoint may be associated with a Uniform Resource Locator (URL). An API server may host API endpoints such that the API server may accept, and process calls directed to the URLs of the endpoints.

The interface location between the API and the VR headset may be at an API endpoint. The API endpoint may accept a request from the VR headset. The API endpoint may send back a response to the VR headset.

The interface location between the API and the AI virtual assistant may be an API endpoint. The API endpoint may accept a request from the AI virtual assistant. The API endpoint may send back a response to the AI virtual assistant.

The endpoint in the API may accept a request from the VR headset and send back a response to the AI virtual assistant. The endpoint in the API may accept a request from the AI virtual assistant and send back a response to the VR headset. The endpoint of the API may be located within the VR headset. The endpoint of the API may be located remotely from the VR headset.

The VR headset may be located at a brick-and-mortal location of the organization. The VR headset may be supplied to the user by the organization. The VR headset may be the user's own VR headset brought by the user to the brick-and-mortal location. The VR headset may be the user's and located at a user's remote location.

The VR headset may be used at a location that is remote from the brick-and-mortar location of the organization. The user may use its own VR headset at a remote location. The user may use a VR headset supplied by the organization at a remote location.

The interface may take place in the VR headset. The interface may take place remotely from the VR headset.

The API may be secured with authorization tokens. Authorization tokens may be used to validate the identity of the user. The authorization may include the user logging into their account that they have with the organization.

The API may be secured with API keys. API keys may facilitate the API to verify the VR headset and the AI virtual assistant to confirm they are what they report to be.

The user's request for assistance may relate to an account the user has with the organization. The request may include a financial matter. The request may include a request about the user's mortgage. The request may include a request about the user's credit and debit cards. The request may include a request about the user's credit score. The request may include a request about automated bill paying. The request may include a request about the user's savings and checking account. The request may include a request about wealth management. The request may include a request about insurance.

The AI virtual assistant may confirm with the user that the AI virtual assistant correctly understands the user's request.

The AI virtual assistant may be configured to determine a team in the organization that can assist the user. The team may be a team in a contact center. The team may be a team in a call center. The team may perform a designated function within the organization.

The team may include a user service team, a mortgage team, a credit card team, a debit card team, a cybersecurity team, an investment team, a banking account team, a fraud team, a refund team, an identify preservation team, a credit score team, and combinations of these teams.

The AI virtual assistant may be configured to transfer the user to an agent in the team that was selected by the AI virtual assistant as being able to assist the user. The agent may be in a financial center. The agent may be in a store. The agent may be in a contact center. The agent may be in a call center.

The agent may be a member of a team. The team may include two or more agents. The team may include one agent. The agent may include a user service agent, a mortgage agent, a credit card agent, a debit card agent, a cybersecurity agent, an investment agent, a banking account agent, a fraud agent, a refund agent, an identify preservation agent, and a credit score agent.

The AI virtual assistant and the VR headset, integrated with each other using the API, are configured to conduct real-time communication between the agent and the user to resolve the user's request.

The brick-and-mortar location may be a financial center.

The AI virtual assistant may be a virtual financial assistant ("VFA").

The VR headset may utilize VR, augmented reality ("AR"), extended reality ("XR"), spatial computing, or combinations herein.

The system may improve service for the user. The system may improve service for the user and may thereby lead to an improved level of user satisfaction.

The real-time communication between the agent and the user may include the VR headset worn by the user. The VR headset may translate the user's speech in the user's language into text in the agent's language. The user may wear a VR headset. The AI virtual assistant may transmit the text. The AI virtual assistant may transmit the text and present it to the agent as speech. The VR headset may transmit the information to the agent as text. The VR headset may transmit the information to the agent as speech. The AI virtual assistant may generate the speech from text provided by the API from the VR headset.

The agent may type text in the agent's language that the AI virtual assistant transmits to the VR headset worn by the user. The VR headset may present the communication to the user as text. The VR headset may translate the text and present it in the user's language. The VR headset may generate the language.

The agent may use speech to reply to the user. The agent may wear a VR headset that translates the speech from the agent's language into text in the user's language. The agent's VR headset may be integrated with the AI virtual assistant with an API. The API may be used to integrate both the agent's VR headset and the user's VR headset with the AI virtual assistant. A separate API may be used to integrate the agent's VR headset with the AI virtual assistant and the user's VR headset with the AI virtual assistant.

The AI virtual assistant may translate the speech from the agent's language into text in the user's language. The AI virtual assistant may transmit the text to the VR headset worn by the user. The VR headset may present the communication to the user as text. The VR headset may translate the communication and present it to the user in a language known by the user. The VR headset may generate spoken language.

The agent's VR headset may translate a communication spoken by the agent in the agent's language. The agent's VR headset may translate the communication into text in the user's language. The AI virtual assistant may transmit the the text to the VR headset of the user in the user's language.

The VR headset may present the communication to the user as text in the user's language or as speech in the user's language.

The agent may communicate in real-time with the user despite the agent not being proficient in the user's language.

The agent's language may be English. The user's language may be a language other than English.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all the elements and apparatus of system 100.

Computer 101 may have a processor 103, including a central processing unit ("CPU"), for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components, such as graphics processing unit ("GPU"), EEPROM, Flash memory, neural-network processing elements, or any other suitable components, may also be part of the computer 101.

Memory 115 may be comprised of any suitable permanent storage technology-e.g., a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network interface 113. System 100 may operate in a networked environment supporting connections to one or more remote computers, such as terminals 141 and 151. Terminals 141 and 151 may be personal computers or servers that include many or all the elements described above relative to system 100. The network connections depicted in FIG. 1 include a local area network ("LAN") 125 and a wide area network ("WAN") 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that network connections shown are illustrative and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or an API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service ("SMS"), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Programs may include routines, programs, objects, components, data structures, etc., that perform tasks or implement abstract data types. A computing system may be operational with distributed computing environments. Tasks may be performed by remote processing devices that are linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Programs may include routines, programs, objects, components, data structures, etc., that perform tasks or implement data types. The invention may also be practiced in distributed computing environments. Tasks may be performed by remote processing devices that are linked through a communications network. In a distributed computing environment, programs may be in both local and remote computer storage media including memory storage devices. It should be noted that such programs may be considered for the purposes of this application as engines with respect to the performance of the tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. Differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
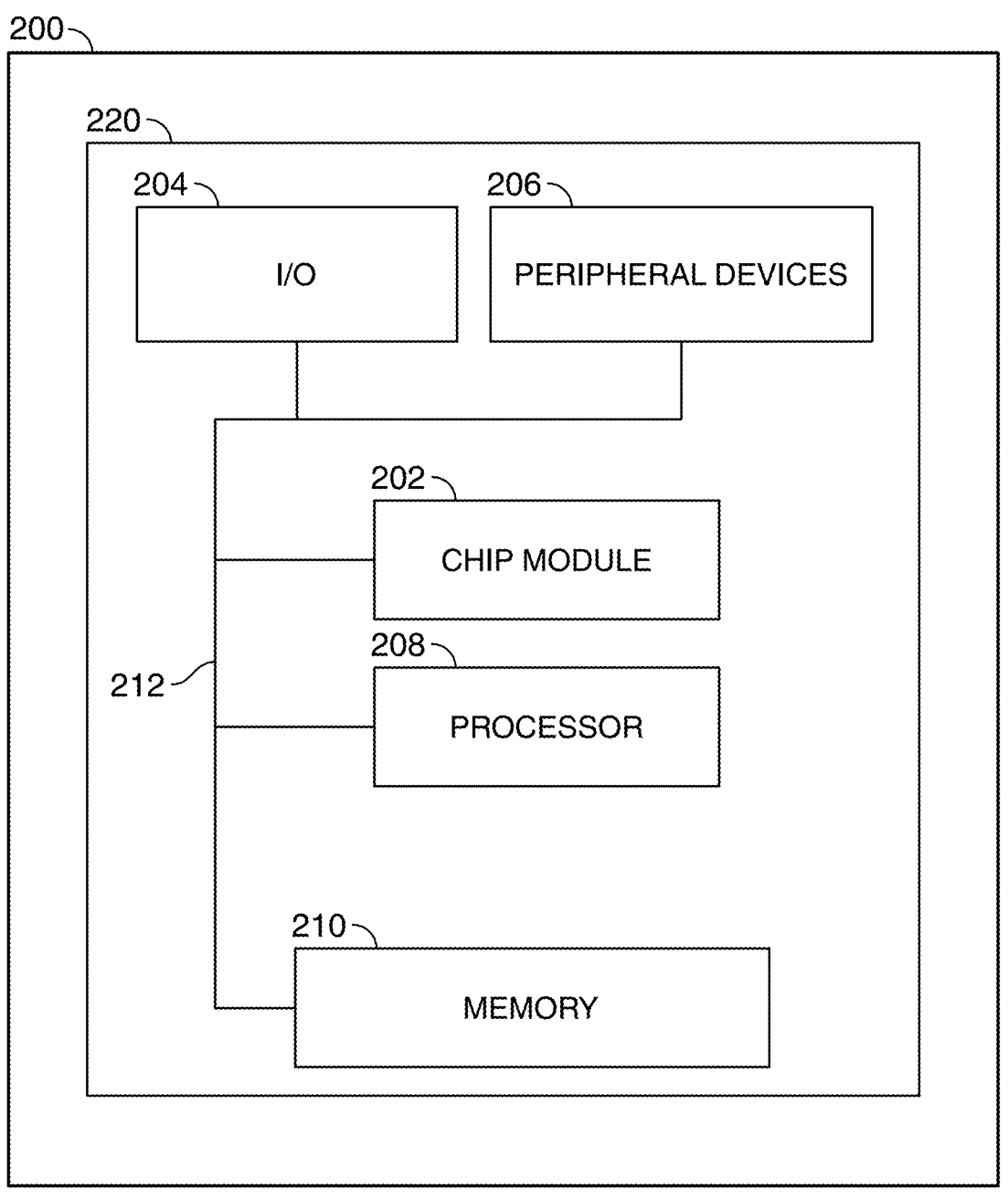
FIG. 2 shows an illustrative block diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, that may include one or more integrated circuits, and that may include logic configured to perform any other suitable logical operations.

Apparatus 200 may include one or more of the following components: I/O circuitry 204, that may include a transmitter device and a receiver device and may interface with fiber optic cable, coaxial cable, telephone lines, wireless devices, PHY layer hardware, a keypad/display control device or any other suitable media or devices; peripheral devices 206, that may include counter timers, real-time timers, power-on reset generators or any other suitable peripheral devices; logical processing device 208, that may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119 (shown in FIG. 1), signals, and/or any other suitable information or data structures.

A system bus or other interconnections 212 may couple components 202, 204, 206, 208 and 210 and may be present on one or more circuit boards such as circuit board 220. In some embodiments, a single chip may integrate the components. The chip may be silicon-based.

Figure 3:
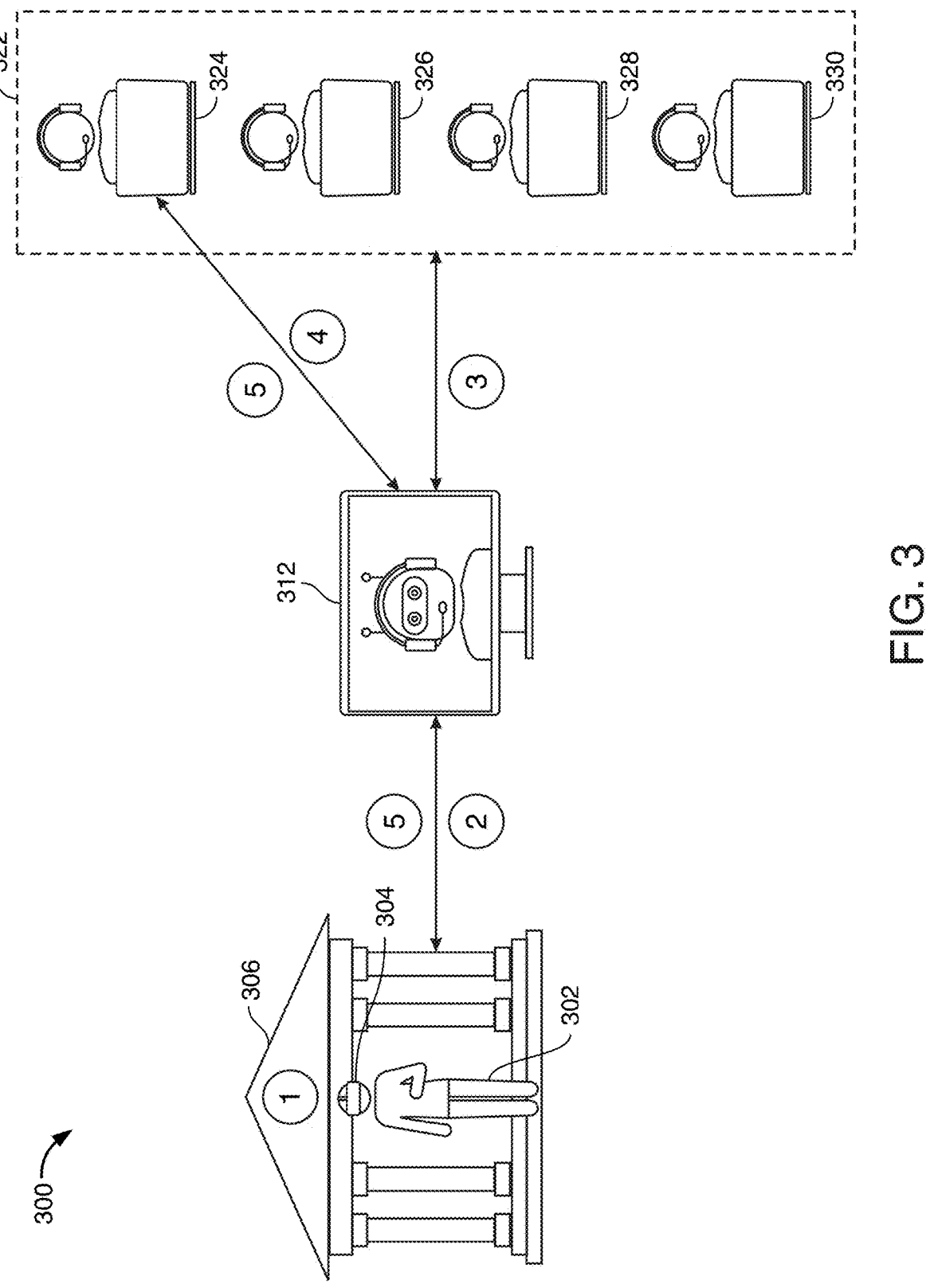
FIG. 3 shows an illustrative block diagram in accordance with principles of the disclosure.

FIG. 3 shows illustrative block diagram 300. Illustrative block diagram 300 may show an apparatus that includes a system for improving service to the user who is proficient in a language different than the language spoken at a brick-and-mortar location of an organization.

At step 1, user 302 is shown as using the system. User 302 may wear a VR headset 304. User 302 may be situated at brick-and-mortar location 306 of an organization. User 302 may speak in the user's language. Agents at brick-and-mortar location 306 may lack proficiency in the user's language. Agents at brick-and-mortar location 306 may speak in the agent's language in which user 302 may lack proficiency. VR headset 304 may identify the user's language spoken by user 302. VR headset 304 may translate the user's language into text in the agent's language.

At step 2, the VR headset 304 may be integrated with an API to AI virtual assistant 312. VR headset 304 may be configured to transmit the text to provide it to AI virtual assistant 312. AI virtual assistant 312 may be configured to confirm with user 302 that the AI virtual assistant correctly understands the request of user 302.

At step 3, the AI virtual assistant 312 may be configured to determine which team 322 in the organization may assist the user. Team 322 may address financial matters. Team 322 may address mortgage inquiries. Team 322 may address credit card and debit card inquiries. Team 322 may address credit score inquiries. Team 322 may address automated bill paying inquiries. Team 322 may address savings account and checking account inquiries. Team 322 may address wealth management inquiries. Team 322 may address insurance inquiries. Team 322 may address cybersecurity inquiries. Team 322 may address fraud inquiries. Team 322 may address identity preservation. Team 322 may address refund inquiries.

Team 322 may include agent 324, agent 326, agent 328, and agent 330. Team 322 may be a team in a call center and/or a contact center. The agents may be agents in the call center and/or the contact center. The agents may be proficient in speaking and understanding the agent's language.

At step 4, the AI virtual assistant may be configured to transfer user 302 to agent 324 in team 322 to address a request of user 302. Agent 324 may be randomly selected. Agent 324 may be the next agent who is available in a queue in team 322. Agent 324 may possess certain skills that make them most appropriate to address the needs of user 302.

At step 5, AI virtual assistant 312 and VR headset 304 may be configured to conduct real-time communication between agent 324 and user 302 to resolve the request of user 302. The API may integrate AI virtual assistant 312 and VR headset 304 with one another. This API integration may facilitate real-time communication between agent 324 and user 302.

Real-time communication between agent 324 and user 302 may include VR headset 304 worn by user 302 translating a spoken communication by user 302 in user's language into text in agent's language. AI virtual assistant 312 and/or VR headset 304 may transmit the text and present the text to agent 324 as text in agent's language. AI virtual assistant 312 and/or VR headset 304 may transmit the text and present it to agent 324 as speech in the agent's language.

Agent 324 may type text in the agent's language that AI virtual assistant 312 transmits to VR headset 304 worn by user 302. VR headset 304 may present the communication to user 302 as text in the user's language. VR headset 304 may convert the text into speech in the user's language.

Agent 324 may use speech in the agent's language to reply to the user. Agent 324 may wear a VR headset that translates the speech into text in the user's language spoken by user 302. VR headset of agent 324 may be integrated with AI virtual assistant 312 with an API. The API may be used to integrate the VR headset of agent 324 and VR headset 304 of user 302 with AI virtual assistant 312. A separate API may be used to integrate the VR headset of agent 324 with AI virtual assistant 312 and VR headset 304 of user 302 with AI virtual assistant 312.

AI virtual assistant 312 may translate the speech in the agent's language into text in the user's language. AI virtual assistant 312 may transmit the text to VR headset 304 worn by user 302. VR headset 304 may present the communication to user 302 as text in the user's language. The text may be converted by VR headset 304 into speech in the user's language. VR headset 304 may present the communication to user 302 in the user's language.

Agent 324 may communicate in real-time with user 302 despite agent 324 not being proficient in the user's language. User 302 may communicate in real-time with Agent 324 despite user 302 not being proficient in the agent's language.

Figure 4:
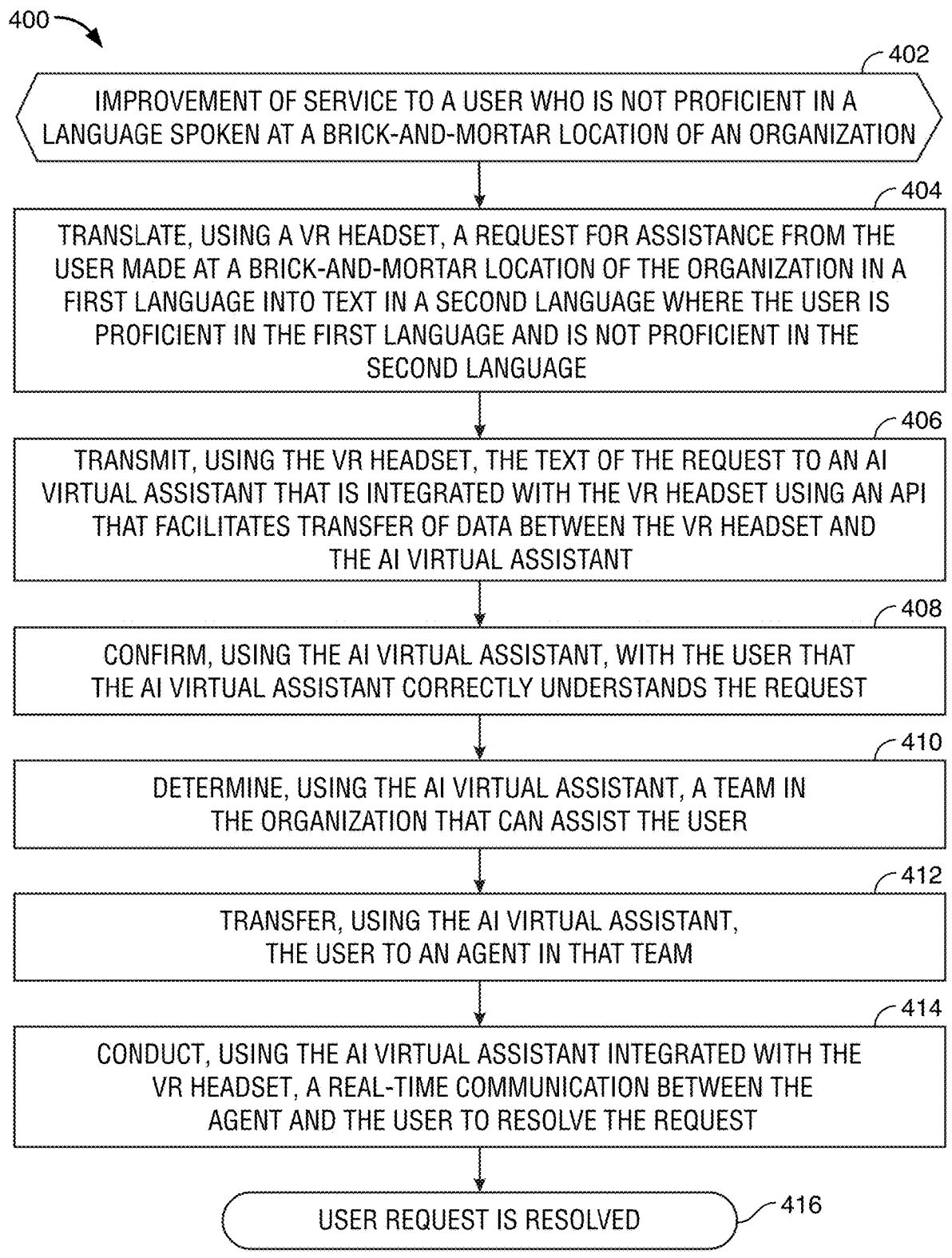
FIG. 4 shows an illustrative flowchart in accordance with principles of the disclosure.

FIG. 4 shows illustrative flowchart 400, beginning at step 402, that may provide a process for improving service to the user who is not proficient in a language spoken at a brick-and-mortar location of an organization.

At step 404, the VR headset may translate a request for assistance from the user made at a brick-and-mortar location of the organization in the user's language that may include a first language into text in the agent's language that may include a second language. The user may be proficient in the user's language but not in the agent's language.

At step 406, the VR headset may transmit the text of the user's request to the AI virtual assistant. The API may integrate the AI virtual assistant with the VR headset. The AI virtual assistant may be a VFA.

At step 408, the AI virtual assistant may confirm with the user that the AI virtual assistant correctly understands the user's request.

At step 410, the AI virtual assistant may determine a team in the organization that can assist the user. The team may be best situated in the organization to assist the user. The team may be a team in a contact center. The team may be a team in a call center.

The team may include a user service team, a financial services team, a mortgage services team, a credit card and debit card services team, a cybersecurity services team, an investment services team, a fraud services team, a refund services team, an identify preservation team, a credit score services team, and combinations of these teams.

At step 412, AI virtual assistant may transfer the user to an agent in the team that was selected by the AI virtual assistant as being able to assist the user. The agent may be randomly assigned. The agent may be assigned based on the agent's expertise. The agent may be in a financial center. The agent may be in a store. The agent may be in a contact center. The agent may be in a call center.

The agent may be a member of a team. The agent may include a user service agent, a financial services agent, a mortgage agent, a credit card and debit card agent, a cybersecurity agent, an investment services agent, a fraud agent, a refund agent, an identify preservation agent, and a credit score agent.

At step 414, the API may integrate the AI virtual assistant with the VR headset to facilitate real-time communication between the agent and the user to resolve the user's request.

The real-time communication between the agent and the user may involve the VR headset worn by the user. The VR headset may translate the user's request from the user's language in which the user is proficient and agent in call center or a contact center are not proficient into the agent's language that the agent is proficient, but the user is not proficient. The VR headset may produce text in the latter language. The AI virtual assistant may transmit the text to an agent. The AI virtual assistant may transmit the text and present it to the agent as speech. The VR headset may transmit the information to the agent as text. The VR headset may transmit the information to the agent as speech. The AI virtual assistant may generate the speech.

The agent may type text that the AI virtual assistant transmits to the VR headset worn by the user. The VR headset may translate the text in the agent's language into the user's language. The VR headset may present the translated text as speech.

The agent may use speech to reply to the user. The agent may wear a VR headset that translates the speech into text. The agent may speak to the AI virtual assistant that translates the speech into text. The AI virtual assistant may transmit the text to the VR headset worn by the user. The VR headset may present the communication to the user as text in the user's language. The VR headset may present the communication to the user as speech in the user's language.

At step 416, the agent may resolve the user's request.

Thus, provided may be systems and methods relating to improving service to a user who is having trouble in communicating with an organization due to a language barrier.

Persons skilled in the art will appreciate that the present invention can be practiced by other than the described embodiments, which are presented for purposes of illustration rather than of limitation. The present invention is limited only by the claims that follow.

What is claimed is:

1. A system for improved service to a user who is not proficient in a language spoken at a brick-and-mortar location of an organization, the system comprising:

a virtual reality ("VR") headset; and an artificial intelligence ("AI") virtual assistant of the organization, said AI virtual assistant is integrated with the VR headset using an application programming interface ("API") to facilitate transfer of data between the AI virtual assistant and the VR headset;

wherein:

the VR headset is configured to:

translate a request for assistance from a first language into text in a second language, said request spoken by the user using the first language, and said user is wearing the VR headset at the brick-and-mortar location, said VR headset containing trained AI and/or machine learning ("ML") algorithms to identify a specific language spoken by the user, said specific language comprising the first language, to translate the request into text; and transmit the text of the request to the AI virtual assistant, said text being in the second language;

the AI virtual assistant is configured to:

confirm with the user that the AI virtual assistant has a correct understanding of the request;

determine a team in the organization that can assist the user; and transfer the user to an agent, said agent being a next available agent in a queue in a team selected by the AI virtual assistant as being able to assist the user, said agent possessing skills that make the agent appropriate to address the request of the user; and the AI virtual assistant and the VR headset, integrated with each other using the API to facilitate transfer of data between the AI virtual assistant and the VR headset, are configured to conduct a real-time communication between the agent and the user to resolve the request;

wherein:

the user is proficient in speaking the first language, and has limited, elementary, or no practical proficiency in speaking the second language; and the agent is proficient in speaking the second language, and has limited, elementary, or no practical proficiency in speaking the first language.

2. The system of claim 1 wherein the second language is English, and the first language is a language other than English.

3. The system of claim 1 wherein the agent is located in the brick-and-mortar location, a contact center, or a call center.

4. The system of claim 1 wherein:

the VR headset utilizes VR, augmented reality ("AR"), extended reality ("XR"), spatial computing, or a combination herein; and the VR headset is provided to the user by the organization.

5. The system of claim 1 wherein the system for improved service to the user leads to an improved level of user satisfaction.

6. The system of claim 1 wherein the real-time communication between the agent and the user comprises:

speech, spoken by the user in the first language, that is translated by the VR headset worn by the user into text in the second language, said text in the second language is presented using the AI virtual assistant to the agent as text in the second language or as speech in the second language; and text, typed by the agent in the second language, is transmitted by the AI virtual assistant to the VR headset, worn by the user, said text in the second language is translated into the first language by the VR headset and presented to the user as speech in the first language or text in the first language.

7. The system of claim 1 wherein the real-time communication between the agent and the user comprises:

speech, spoken by the user in the first language, that is translated by the VR headset worn by the user into text in the second language, said text in the second language is presented using the AI virtual assistant to the agent as text in the second language or as speech in the second language, said VR headset being a first VR headset; and speech, spoken by the agent in the second language, is translated by a second VR headset worn by the agent into text in the first language and transmitted by the AI virtual assistant to the first VR headset, worn by the user, said text in the first language is presented using the first VR headset to the user as text in the first language or as speech in the first language.

8. The system of claim 1 wherein:

the brick-and-mortar location is a financial center; and the AI virtual assistant is a virtual financial assistant ("VFA").

9. A method for improving service to a user who is not proficient in a language spoken at a brick-and-mortar location of an organization, the method comprising:

translating, using a virtual reality ("VR") headset, a request for assistance from a first language into text in a second language, said request spoken by the user using the first language, and said user is wearing the VR headset at the brick-and-mortar location of the organization, said VR headset containing trained AI and/or machine learning ("ML") algorithms to identify a specific language spoken by the user, said specific language comprising the first language, to translate the request into text;

transmitting, using the VR headset, the text of the request to an artificial intelligence ("AI") virtual assistant of the organization, said text in the second language, said AI virtual assistant integrated with the VR headset using an application programming interface ("API") to facilitate transfer of data between the AI virtual assistant and the VR headset;

confirming, using the AI virtual assistant, with the user that the AI virtual assistant has a correct understanding of the request;

determining, using the AI virtual assistant, a team in the organization that can assist the user;

transferring, using the AI virtual assistant, the user to an agent, said agent being a next available agent in a queue in a team selected by the AI virtual assistant as being able to assist the user, said agent possessing skills that make the agent appropriate to address the request of the user; and conducting, using the AI virtual assistant integrated with the VR headset using the API, a real-time communication between the agent and the user to resolve the request;

wherein:

the user is proficient in speaking the first language, and has limited, elementary, or no practical proficiency in speaking the second language;

the agent is proficient in speaking the second language, and has limited, elementary, or no practical proficiency in speaking the first language.

10. The method of claim 9 wherein the second language is English, and the first language is a language other than English.

11. The method of claim 9 wherein the agent is in the brick-and-mortar location, a contact center, or a call center.

12. The method of claim 9 wherein:

the VR headset utilizes VR, augmented reality ("AR"), extended reality ("XR"), spatial computing, or a combination herein; and the VR headset is provided to the user by the organization.

13. The method of claim 9 wherein the method for improving service to the user leads to an improved level of user satisfaction.

14. The method of claim 9 wherein the real-time communication between the agent and the user comprises:

speech, spoken by the user in the first language, that is translated by the VR headset worn by the user into text in the second language, said text in the second language is presented using the AI virtual assistant to the agent as text in the second language or as speech in the second language; and text, typed by the agent in the second language, is transmitted by the AI virtual assistant to the VR headset, worn by the user, said text in the second language is translated into the first language by the VR headset and presented to the user as speech in the first language or text in the first language.

15. The method of claim 9 wherein the real-time communication between the agent and the user comprises:

speech, spoken by the user in the first language, that is translated by the VR headset worn by the user into text in the second language, said text in the second language is presented using the AI virtual assistant to the agent as text in the second language or as speech in the second language, said VR headset being a first VR headset; and speech, spoken by the agent in the second language, is translated by a second VR headset worn by the agent into text in the first language and transmitted by the AI virtual assistant to the first VR headset, worn by the user, said text in the first language is presented using the first VR headset to the user as text in the first language or as speech in the first language.

16. The method of claim 9 wherein:

the brick-and-mortar location is a financial center; and the AI virtual assistant is a virtual financial assistant ("VFA").

17. A method for improving service to a user who is not proficient in a language used by a computer application of an organization, the method comprising:

translating, using a virtual reality ("VR") headset, a request for assistance from a first language into text in a second language, said request spoken by the user using the first language, and said user is wearing the VR headset, said VR headset containing trained AI and/or machine learning ("ML") algorithms to identify a specific language spoken by the user, said specific language comprising the first language, to translate the request into text;

transmitting, using the VR headset, the text of the request to an artificial intelligence ("AI") virtual assistant of the organization, said text in the second language, said AI virtual assistant integrated with the VR headset using an application programming interface ("API") to facilitate transfer of data between the AI virtual assistant and the VR headset;

confirming, using the AI virtual assistant, with the user that the AI virtual assistant has a correct understanding of the request;

determining, using the AI virtual assistant, a team in the organization that can assist the user;

transferring, using the AI virtual assistant, the user to an agent, said agent being a next available agent in a queue in a team selected by the AI virtual assistant as being able to assist the user, said agent possessing skills that make the agent appropriate to address the request of the user; and conducting, using the AI virtual assistant integrated with the VR headset using the API, a real-time communication between the agent and the user to resolve the request;

wherein:

the user is proficient in speaking the first language, and has limited, elementary, or no practical proficiency in speaking the second language;

the agent is proficient in speaking the second language, and has limited, elementary, or no practical proficiency in speaking the first language.

18. The method of claim 17 wherein:

the second language is English, and the first language is a language other than English; and the VR headset utilizes VR, augmented reality ("AR"), extended reality ("XR"), spatial computing, or a combination herein.

19. The method of claim 17 wherein the real-time communication between the agent and the user comprises:

speech, spoken by the user in the first language, that is translated by the VR headset worn by the user into text in the second language, said text in the second language is presented using the AI virtual assistant to the agent as text in the second language or as speech in the second language; and text, typed by the agent in the second language, is transmitted by the AI virtual assistant to the VR headset, worn by the user, said text in the second language is translated into the first language by the VR headset and presented to the user as speech in the first language or text in the first language.

20. The method of claim 17 wherein the real-time communication between the agent and the user comprises:

speech, spoken by the user in the first language, that is translated by the VR headset worn by the user into text in the second language, said text in the second language is presented using the AI virtual assistant to the agent as text in the second language or as speech in the second language, said VR headset being a first VR headset; and speech, spoken by the agent in the second language, is translated by a second VR headset worn by the agent into text in the first language and transmitted by the AI virtual assistant to the first VR headset, worn by the user, said text in the first language is presented using the first VR headset to the user as text in the first language or as speech in the first language.

* * * * *